United States Patent
Pleier et al.

[11] 3,807,766
[45] Apr. 30, 1974

[54] TRAILER HITCH

[75] Inventors: Otto Pleier, St. Clair Shores; Ralph R. Sheldon, Spruce, both of Mich.

[73] Assignee: The United States of America as represented by the Secretary of the Army, Washington, D.C.

[22] Filed: Dec. 14, 1972

[21] Appl. No.: 315,065

[52] U.S. Cl. .............................................. 280/433
[51] Int. Cl. ........................................... B62d 53/08
[58] Field of Search ................................... 280/433

[56] References Cited
UNITED STATES PATENTS
2,838,324  6/1958  Dalton ........................... 280/433 X
3,600,005  8/1971  Glaza ................................ 280/433
FOREIGN PATENTS OR APPLICATIONS
214,723  5/1958  Australia ........................... 280/433

*Primary Examiner*—Leo Friaglia
*Attorney, Agent, or Firm*—Edward J. Kelly; Herbert Berl; John F. Schmidt

[57] ABSTRACT

Secured in the semi-trailer floor is a socket member having an internal conical surface forming an inverted cup with a centrally threaded opening in the upper or closed end of the socket. An external frusto-conical surface on a king pin carries a threaded stud at its upper end, engageable with the threaded opening to bring the two conical surfaces into tight, solid engagement. The king pin is held in place by a snap ring lying in a groove in the socket member and engaging the lower shoulder on the frusto-cone of the king pin.

4 Claims, 5 Drawing Figures

3,807,766

TRAILER HITCH

The invention described herein may be manufactured, used, and licensed by or for the Government for governmental purposes without payment to us of any royalty thereon.

BACKGROUND OF THE INVENTION

Field of the Invention

This invention pertains to trailer hitches, and more specifically to the class of hitches commonly used to couple a tractor with a semi-trailer wherein a fifth wheel on the tractor engages a king pin on the semi-trailer.

Description of the Prior Art

Of the prior art known to applicant and in commercial use, trailer hitches include king pins that are welded into place in order to achieve the required structural strength and the rigidity necessary for an acceptable service life. However, replacement of a worn or damaged king pin in such structure is a major maintenance operation, because the trailer cargo must be unloaded to allow a torch cut-out of the old king pin, and welding in a new one. Furthermore, substituting a different size king pin presents the same problem.

In easily replaceable king pin structures, those known to applicant are unsatisfactory as not possessing the needed rigidity and strength.

SUMMARY OF THE INVENTION

The invention here disclosed meets the need for a readily replaceable king pin which has the rigidity and the strength, as well as the service life, that makes for a good trailer hitch. A frusto-conical external surface on a king pin engages a similar internal frusto-conical surface in a socket by means of a threaded connection. The mating conical surfaces provide a wedging action, and the parts are held in engagement by a snap ring which itself is provided with a conical surface in engagement with a conical surface in a suitable groove.

IN THE DRAWINGS

Figure 3:
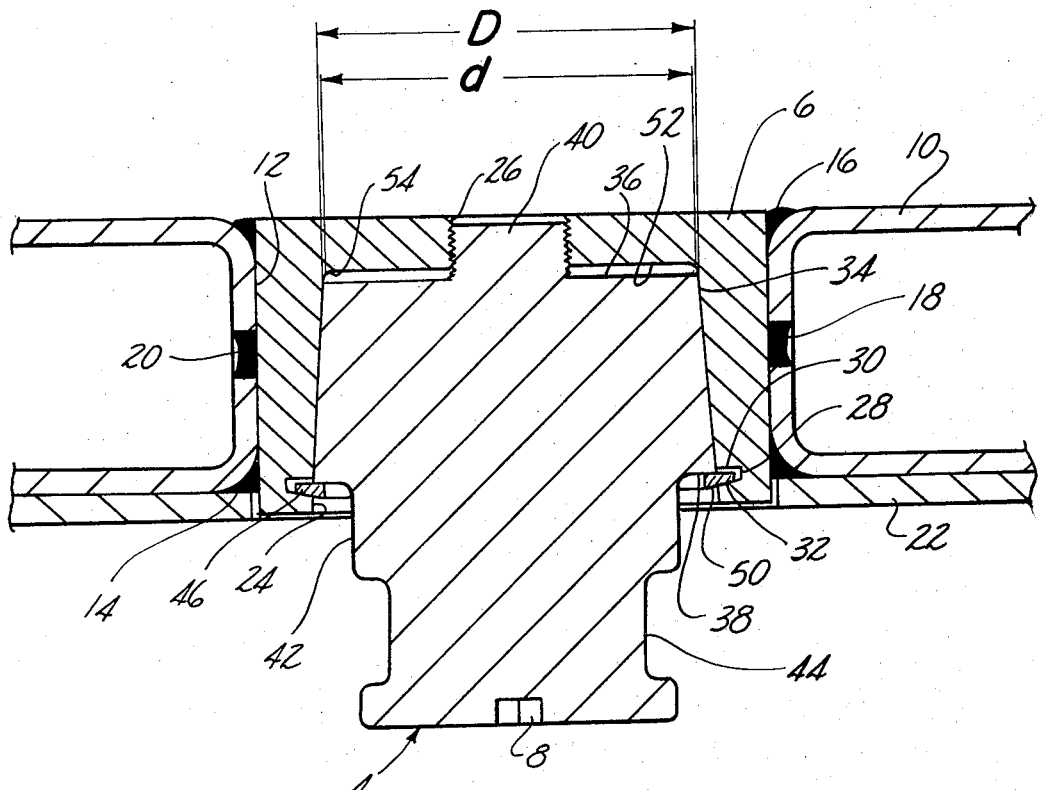
FIG. 3 is a view in section on line 3—3 of FIG. 2.
Figure 4:
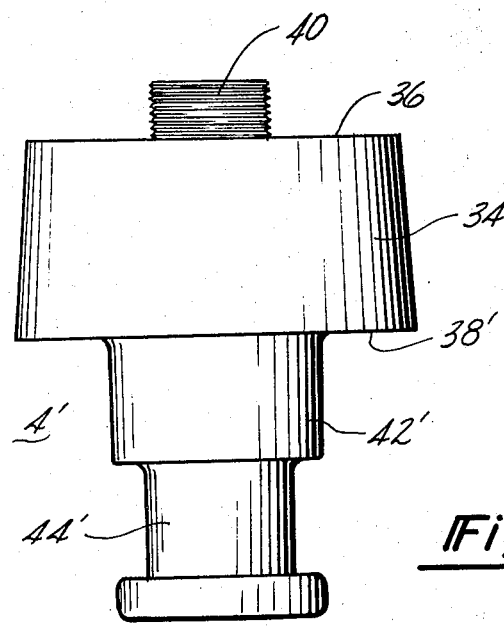
Figure 5:
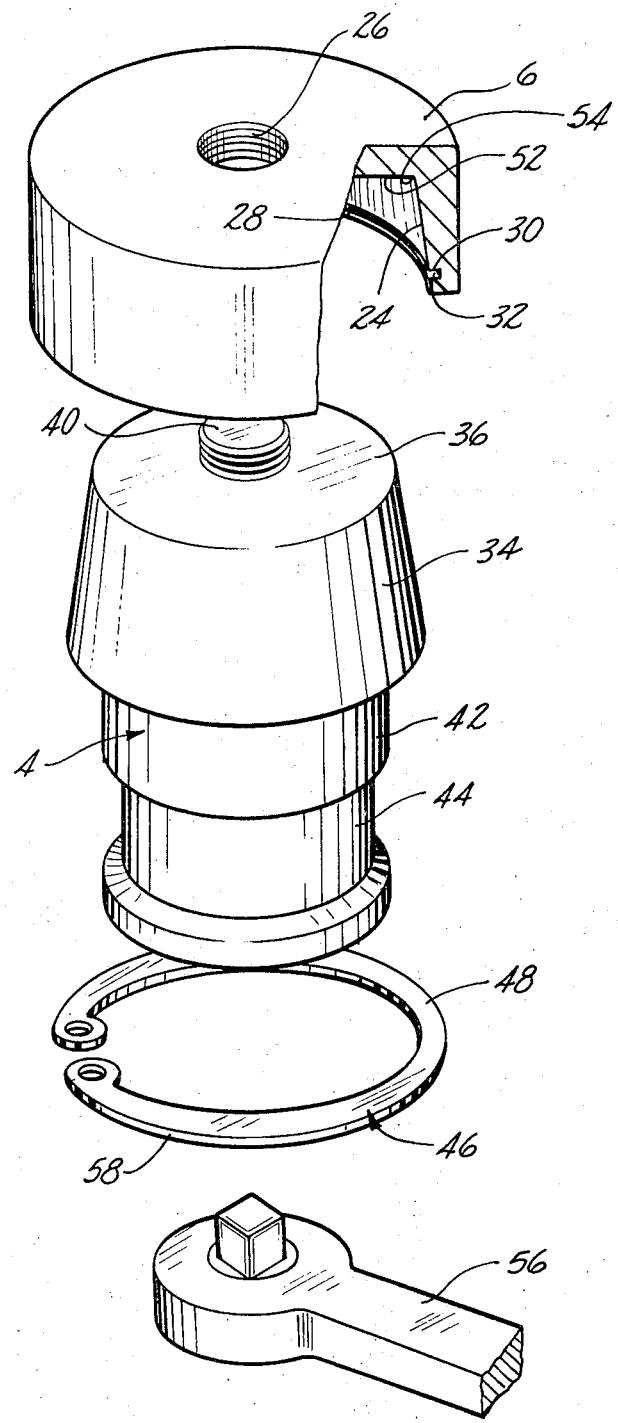

FIG. 4 is a view in elevation of a king pin having the same size upper end as that shown in FIG. 3, but having a different size lower end to fit a different size tractor fifth wheel than the size cooperable with the king pin shown in FIG. 3; and FIG. 5 is an exploded perspective view of a trailer hitch made according to this invention and also showing a wrench usable to disassemble and assemble a hitch.

DESCRIPTION OF THE PREFERRED EMBODIMENT

Figure 1:
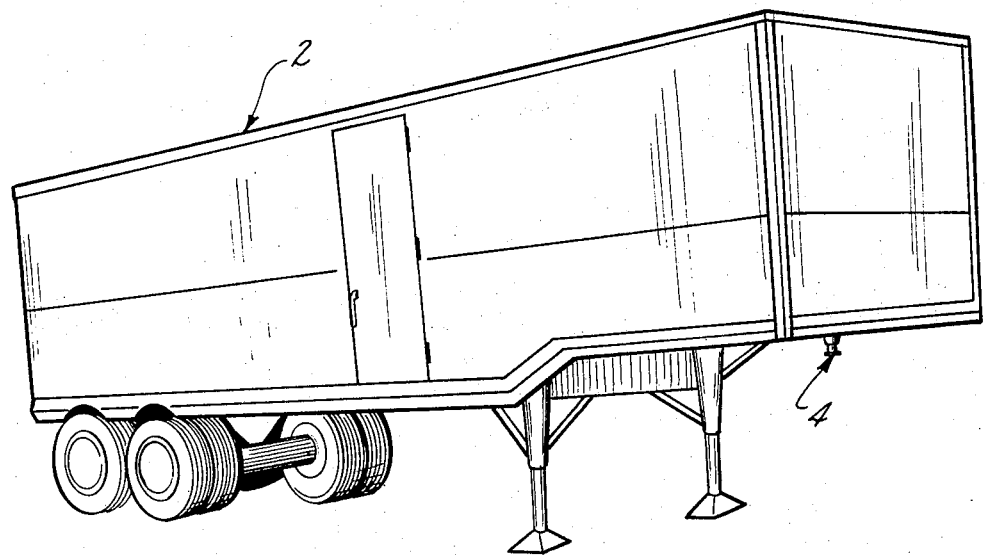
FIG. 1 is a perspective view showing a type of heavy duty cargo semi-trailer equipped with a king pin suitable for use in a hitch of the type herein disclosed and claimed.

FIG. 1 shows a heavy-duty cargo carrier semi-trailer 2 provided with a king pin 4 which is of a size suitable for coupling with one of the standard tractor fifth wheel sizes. As is better seen in FIG. 2, a socket forming member 6 is secured in the trailer floor structure and engages king pin 4, which is provided in its lower face with a wrench socket 8 to enable ready disassembly and assembly of a hitch.

In FIG. 3 can be seen a sectional view of trailer floor structure. The floor structure details form no part of this invention, and will vary from one trailer design to another. The type of trailer contemplated is a very rugged, heavy duty type, such as can be used in off-highway operations, as for example by the military. Here shown is steel structure 10 provided with an aperture 12 to receive socket-forming member 6, welded in place in the aperture by weldments 14, 16, 18, and 20. A fifth wheel plate 22 is secured to the underside of the floor structure in any suitable conventional manner, not shown. It will also be appreciated that, in the finished assembly, member 6 will have its upper surface as nearly flush with the rest of the floor surface as may be practicable.

Member 6 is provided with a socket which forms an internal frusto-conical surface 24. As can be seen by reference to FIGS. 3 and 5, member 6 is like an inverted cup having a substantially central threaded aperture 26. Near the lower edge of conical surface 24, the surface is provided with a groove 28. The upper boundary of groove 28 can be, and preferably is, planar as can be seen at 30 in FIGS. 3 and 5, and the lower boundary is conical, the conical surface being shown at 32.

King pin 4 is formed at its upper portion to have an external frusto-conical surface 34. The frusto-conical part 34 is bounded by upper and lower toroidal surfaces forming shoulders 36 and 38 respectively, from which project, concentrically disposed, a threaded stud 40 and a reduced-diameter portion or member 42, the latter being grooved as at 44 to engage the slot of a conventional tractor-mounted fifth wheel, not shown.

In the assembled hitch, king pin 4 is held in place by a retainer or snap ring 46 lying in groove 28. Preferably, the upper surface 48 of snap ring 46 is planar and tightly engages shoulder 38 of king pin 4. The lower surface 50 of snap ring 46 is preferably conical and engages conical surface 32 of groove 28.

As is best seen in FIG. 3, the minimum diameter D of external frusto-conical surface 34 is slightly greater than the minimum diameter d of internal frusto-conical surface 24; expressed mathematically, $$D > d$$

The amount by which D exceeds d is not critical, but the difference should be great enough to insure that surfaces 34 and 24 always come into tight, solid engagement in the assembled hitch. This requires, as a practical matter, that there be no contact between shoulder 36 and the closure which is toroidal surface 52 in socket forming member 6. Surface 52 could be described as the "inside bottom" of the cup which member 6 forms, but which is inverted in the assembly, as aforesaid. Moreover, to insure tight contact of surfaces 24 and 34, the pieces must be so made that the upper end of frusto-conical surface 34 does not engage the fillet 54 which good design practise calls for instead of a sharp corner, where surfaces 24 and 52 come together. Still other precautions in special situations will be apparent to those skilled in the art to insure that no structural features of the parts will interfere to prevent the rigid, tight engagement of conical surfaces 24 and 34. The object is to make the assembly of king pin 4, socket member 6, and floor 10 as nearly solid as possible.

Reference is now made to FIG. 4, where a king pin 4' is as nearly identical as possible with king pin 4, FIG. 3, as to conical surface 34, shoulder 36, and stud 40, so as to be interchangeable with king pin 4 in socket member 6. Where king pins 4 and 4' differ is in the part of the king pin below conical surface 34. Close inspection of the drawings shows that shoulder 38', reduced-diameter portion 42', and groove 44' differ from shoulder 38, portion 42, and groove 44 because the portion 42' is smaller than the portion 42. The object is a trailer hitch that will accept different size king pins to enable coupling with a different size fifth wheel. Such interchangeability is especially desirable in military applications where a mix of equipment originating with different but allied nations may be impossible with conventional hitch structures because of varying fifth wheel sizes.

OPERATION

Figure 2:
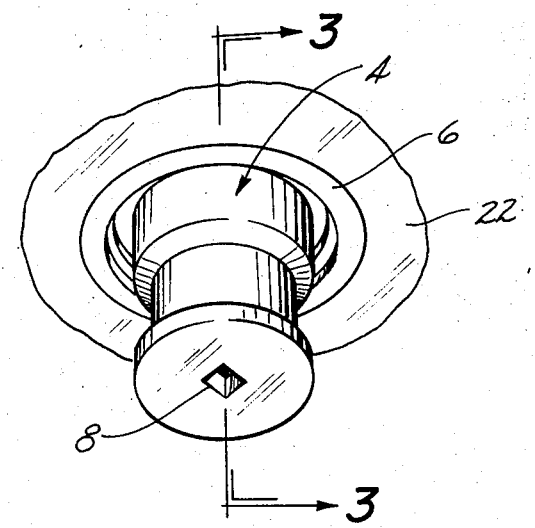
FIG. 2 is a perspective view from the underside of the trailer king pin made according to this invention and shown in FIG. 1.

FIG. 5, the exploded view, shows a wrench 56 which is adapted to engage wrench socket 8, FIGS. 2 and 3, in the lowermost surface of king pin 4 to turn pin 4 for disassembly and assembly of the hitch, turning threaded stud 40 relative to member 6 to disengage or engage the threaded members.

Before attempting to remove the king pin from a hitch assembly, the operator removes retainer or snap ring 46 from groove 28, and then unscrews stud 40 by turning pin 4 with the help of wrench 56. Unless the threads are badly corroded, it will usually suffice to start the unscrewing operation with the help of the wrench and thereafter turning the pin out "by hand".

The replacement pin is turned in manually as far as possible, and then is further pulled up into a very rigid, solid, tight engagement of conical surfaces 24 and 34 by means of wrench 56. A good, solid assembly is assured by the wedging action of the cooperating or mating conical surfaces. After king pin 4 has been wrenched in as far as possible, retainer or snap ring 46 is slipped into place. Dimensional tolerances will be such that snap ring 46, in the assembly, never engages its peripheral surface 58 with the outer peripheral limits of groove 28 (or, "snap ring 46 must not bottom in groove 28"); also, however, in the final assembly, snap ring 46 must always have some residual radially outward bias to insure a never-ending bias of expansion in ring 46. The mating conical surfaces 32 and 50 give the ring 46 a wedging action that helps to insure against play or looseness of pin 4 in socket member 6.

Other operating details and advantages of this invention will be apparent to those skilled in the art.

We wish it to be understood that we do not desire to be limited to the exact details of construction shown and described for obvious modifications will occur to a person skilled in the art.

We claim:

1. A trailer hitch comprising: a socket-forming member adapted to form part of a trailer floor, said member having a frusto-conical internal surface which converges upward when said member is secured in place as an integral part of said floor and terminating in a closure adapted to be flush with the upper surface of said floor, and the closure having a threaded opening coaxial with said surface; a king pin having an external frusto-conical surface similar to and in engagement with said internal surface, a threaded stud at the upper end of the kingpin engaging the socket-forming member in said threaded opening, a reduced-diameter portion below said external surface and forming with said external surface a shoulder, and a groove in the reduced-diameter portion below said shoulder, the groove adapted to cooperate with a tractor fifth wheel to couple a tractor and a trailer together; and means cooperating with the socket-forming member and with the kingpin to hold the kingpin in the socket of the socket-forming member; said holding means comprising a groove in the lower end of said internal conical surface, and a retainer ring cooperating in the second-named groove with the socket-forming member and with said shoulder; said groove and retainer ring being constructed and arranged so that the ring exerts an upward acting locking force on the shoulder of the kingpin.

2. A hitch assembly as in claim 1 wherein the extreme upper end of the internal frustro-conical surface is of a diameter that is smaller than the diameter of the extreme upper end of the external frustro-conical surface on the kingpin, whereby the shoulder at the upper end of the kinpin between the stud and the external frustro-conical surface cannot touch the shoulder in the socket between said threaded opening and the extreme upper end of the internal frustro-conical surface.

3. A tractor-trailer coupling comprising a socket member carried by the trailer; said member having an upwardly convergent frustro-conical socket surface, and an internally threaded mounting surface coaxial with the socket surface; a kingpin having an externally threaded side surface adapted to screw upwardly into the threaded surface of the socket member to releasably secure the kingpin on the trailer; said kingpin having a frustro-conical side surface adapted to forcibly engage the aforementioned frustro-conical socket surface to frictionally lock the kingpin in place; and positive-acting means preventing inadvertant unthreading of the kingpin from the socket member; said preventing means comprising an annular shoulder formed on the kingpin, a peripheral groove formed in the socket member, and a resilient outward expandable split ring removably disposed within the groove to slidably ride on the annular shoulder; the lower side surfaces of said groove and split ring being inclined radially outward whereby resilient expansion forces within the ring cause the ring to expand and slide outward and upwardly on the groove lower surface so that the upper surface of the ring maintains pressure contact with the shoulder on the kingpin.

4. A coupling as in claim 3, wherein the extreme upper end of the frustro-conical socket surface has a smaller diameter than the extreme upper end of the frustro-conical side surface of the kingpin, whereby an axial clearance space is formed between the king pin and the end surface of the socket.

* * * * *